United States Patent
Ashokan et al.

(10) Patent No.: US 9,407,734 B2
(45) Date of Patent: Aug. 2, 2016

(54) SYSTEM AND METHOD FOR EFFICIENT FRAME AGGREGATION BASED ON AGGREGATION LIMITS OR PARAMETERS

(71) Applicant: Aruba Networks, Inc., Sunnyvale, CA (US)

(72) Inventors: Kiran Ashokan, Sunnyvale, CA (US); Muthukumar Subramanian, Fremont, CA (US); Venkatesh Kannan, Sunnyvale, CA (US); Parag Dedhia, Fremont, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 79 days.

(21) Appl. No.: 14/170,297

(22) Filed: Jan. 31, 2014

(65) Prior Publication Data

US 2015/0222562 A1  Aug. 6, 2015

(51) Int. Cl.
*H04L 12/26* (2006.01)
*H04L 29/06* (2006.01)
*H04L 12/807* (2013.01)

(52) U.S. Cl.
CPC ............... *H04L 69/22* (2013.01); *H04L 47/27* (2013.01)

(58) Field of Classification Search
CPC ..... H04L 1/0007; H04L 1/0018; H04L 47/10; H04L 12/5693; H04L 1/0001; H04L 1/0057
USPC .......................................... 370/252, 238, 254
See application file for complete search history.

(56) References Cited

U.S. PATENT DOCUMENTS

| | | | |
|---|---|---|---|
| 8,982,914 B2* | 3/2015 | Christin et al. | 370/537 |
| 2005/0122960 A1* | 6/2005 | Khan | 370/352 |
| 2005/0238054 A1* | 10/2005 | Sharma | 370/473 |
| 2008/0287069 A1* | 11/2008 | Yoshimura | 455/69 |
| 2011/0019557 A1* | 1/2011 | Hassan et al. | 370/252 |
| 2014/0112322 A1* | 4/2014 | Ram et al. | 370/338 |
| 2014/0254424 A1* | 9/2014 | Gao et al. | 370/254 |
| 2014/0269766 A1* | 9/2014 | Gopalasetty et al. | 370/473 |
| 2015/0131541 A1* | 5/2015 | Prajapati et al. | 370/329 |

* cited by examiner

*Primary Examiner* — Dang Ton
*Assistant Examiner* — Sai Aung
(74) *Attorney, Agent, or Firm* — Hewlett Packard Enterprise Patent Department

(57) ABSTRACT

The present disclosure discloses a method and network device for efficient frame aggregation. Specifically, a network device queues a first set of packets until one of the first set of aggregation limits is detected. The network device then transmits the first set of packets, and receives feedback information. Then, the network device modifies the first set of aggregation limits to obtain a second set of aggregation limits based on the feedback information. The network device queues a second set of packets until one of the second set of aggregation limits is detected, and then transmits the second set of packets. Also, the network device determines whether a received packet has a particular characteristic. If so, the network device transmits the first set of packets before at least one of the first set of aggregation limits is detected.

21 Claims, 8 Drawing Sheets

SYSTEM AND METHOD FOR EFFICIENT FRAME AGGREGATION BASED ON AGGREGATION LIMITS OR PARAMETERS

FIELD

The present disclosure relates to frame aggregation in a wireless local area network. In particular, the present disclosure relates to efficient frame aggregation based on dynamic analysis of packet contents and network environments.

BACKGROUND

Wireless digital networks, such as networks operating under the current Electrical and Electronics Engineers (IEEE) 802.11 standards, are spreading in their popularity and availability. In a wireless local area network (WLAN) deployment, a number of clients can be connected to the same wireless network via one or more access points.

Frame aggregation generally refers to sending two or more data frames in a single transmission in order to increases throughput. Every frame transmitted by wireless device has a significant amount of overhead, including radio level headers, Media Access Control (MAC) frame fields, interframe spacing, and acknowledgment of transmitted frames. At the highest data rates, this overhead can consume more bandwidth than the payload data frame. To address this issue, the IEEE 802.11n standard defines two types of frame aggregation: (1) Media Access Control (MAC) Service Data Unit (MSDU) aggregation, and (2) MAC Protocol Data Unit (MPDU) aggregation. Both types group several data frames into one large frame. Because management information needs to be specified only once per frame, the ratio of payload data to the total volume of data is higher, allowing higher throughput.

More specifically, Aggregated MAC Protocol Data Unit (A-MPDU) generally refers to frame aggregations performed below the MAC layer where multiple frames associated with a single source and a single destination are aggregated and transmitted consecutively. By contrast, Aggregated MAC Service Data Unit (A-MSDU) generally refers to frame aggregations performed above the MAC layer where multiple frames associated with a common destination is aggregated into and transmitted as a single frame.

However, queuing frames for aggregation (A-MPDU and/or A-MSDU) impacts latency. A frame aggregation logic may determine whether to aggregate a frame based on a number of inputs, such as a timeout value, a number of frames, a frame length, etc. For example, a frame aggregation logic can wait for a pre-determined period of time after receiving a packet, e.g., 10 nanoseconds, prior to determining whether to queue the received packet to be sent later as an aggregated frame or send the packet out as a separate frame. Moreover, a frame aggregation logic can aggregate queued frames when a threshold number of frames is reached in the queue. Finally, a frame aggregation logic can aggregate queued frames when the combined length of queued frames exceeds a threshold value.

However, such use of fixed inputs by the frame aggregation (A-MPDU and/or A-MSDU) logic is not optimal under certain circumstances. For example, assuming that incoming packets are received at 10 nanoseconds interval, and that the frame aggregation logic has a predetermined timeout value of 10 nanoseconds. Thus, each incoming packet will be held for 10 nanoseconds and transmitted before the next packet is received. Hence, transmission of every packet will be delayed by 10 nanoseconds in this case.

As another example, in a Transmission Control Protocol (TCP) session even when a packet is flagged as the last packet in the TCP session, and therefore no more packets are anticipated, the frame aggregation logic configured with fixed inputs will still hold the packet for a predetermined timeout value, instead of transmitting the packet immediately after receipt.

Furthermore, conventional frame aggregation logic does not work well in a lossy network environment. The frame aggregation operation will generate frames with relatively large frame size. If an aggregated frame (e.g., an A-MSDU packet) is lost in transmission, all of the packets in the aggregated frame would have to be retransmitted. In a lossy environment where there may be a short time interferer producing signal interference at a fixed interval, e.g., every 10 nanoseconds, the likelihood of the aggregated frame being lost in transmission due to the interference would be increased, because it will take longer time for the aggregated frame to complete transmission than it will take for each individual packet.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to frame aggregations in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to frame aggregations in a wireless local area network. In particular, the present disclosure relates to efficient frame aggregation based on dynamic analysis of packet contents and network environments.

With the solution provided herein, the disclosed network device receives and queues a first set of packets targeted for a second device until at least one of the first set of aggregation limits is detected. The disclosed network device then transmits the first set of packets responsive to detecting at least one of the first set of aggregation limits. Next, the network device receives feedback information indicating whether or not the first set of packets was successfully received by the second device. Then, the disclosed network device modifies one or more of the first set of aggregation limits to obtain a second set of aggregation limits based on the feedback information. Subsequently, the disclosed network device receives and queues a second set of packets targeted for the second device until at least one of the second set of aggregation limits is detected. The disclosed network device then transmits the second set of packets responsive to detecting at least one of the second set of aggregation limits.

Moreover, according to solution provided herein, the disclosed network device receives and queues a first set of packets targeted for a second device until at least one of the first set of aggregation limits is detected. The disclosed network device then determines that a received particular packet has a particular characteristic prior to detecting at least one of the first set of aggregation limits. The disclosed network device then transmits the first set of packets before at least one of the first set of aggregation limits is detected responsive to determining that the received particular packet has the particular characteristic.

Computing Environment

Figure 1:
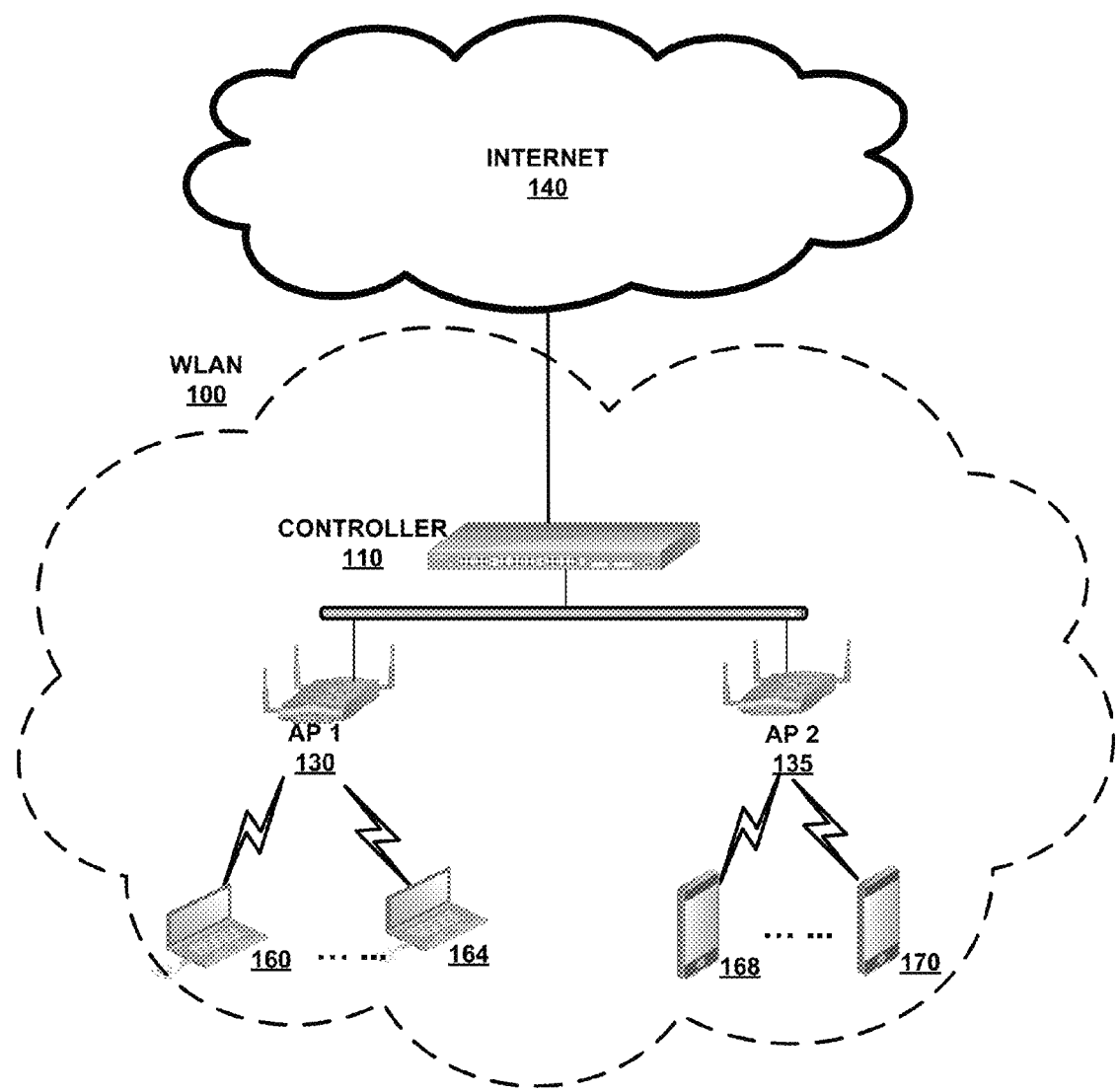
FIG. 1 shows an exemplary wireless digital network environment according to embodiments of the present disclosure.

FIG. 1 shows an exemplary wireless digital network environment according to embodiments of the present disclosure. FIG. 1 includes a controller 110 in a wireless local area network (WLAN) 100. WLAN 100 is also connected to Internet 140. Controller 110 is communicatively coupled with one or more access points (APs), such as AP1 130 and AP2 135, to provide wireless network services by transmitting network packets, including aggregated frames to a number of wireless client devices, such as client devices 160-164 and 166-170.

Network according to embodiments of the present disclosure may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers, access points or routers capable of controlling functions, etc. Each network control plane device may be located in a separate sub-network. The network control plane device may manage one or more network management devices, such as access points or network servers, within the sub-network.

Moreover, in the exemplary network depicted in FIG. 1, a number of client devices are connected to the access points in the WLAN. For example, client devices 160-164 are associated with AP1 130, and client devices 168-170 are associated with AP2 135. Note that, client devices may be connected to the access points via wired or wireless connections.

During operations, a wireless station, such as client device 160, client device 164, or client device 168, is associated with a respective access point, e.g., access point AP1 130, access point AP2 135, etc. Moreover, when multiple network packets with a common destination address corresponding to the same client device (e.g., client device 164), are received, a frame aggregation logic at either a controller (e.g., controller 110) or an AP (e.g., AP1 130) can aggregate the multiple network packets prior to transmitting to the client device (e.g., client device 164). In some embodiments, the frame aggregation logic will aggregate incoming network packets having both the same source address and the same destination address.

Frame Aggregation Logic Based on A-MSDU and/or A-MPDU

Figure 2A:
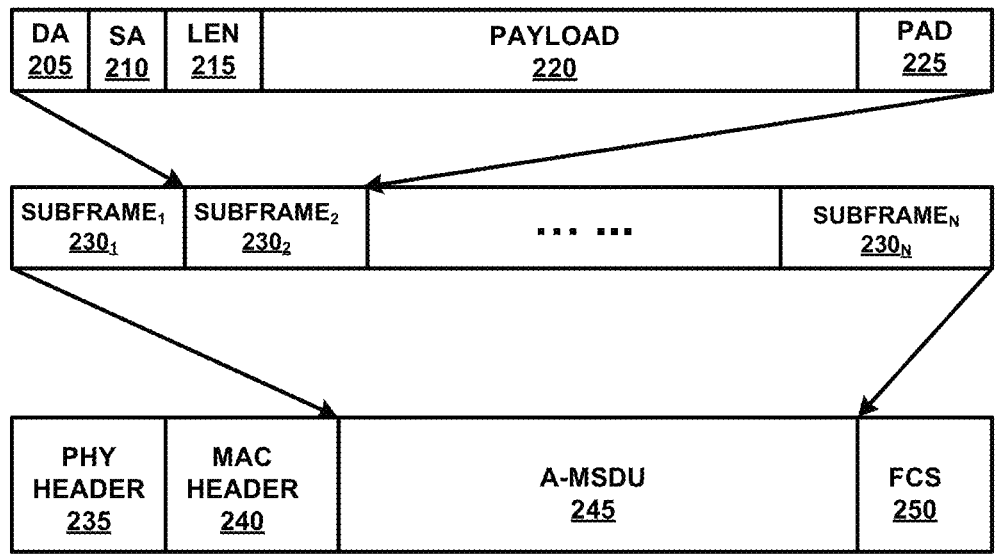
FIG. 2A illustrates an exemplary A-MSDU aggregation according to embodiments of the present disclosure.
Figure 2B:
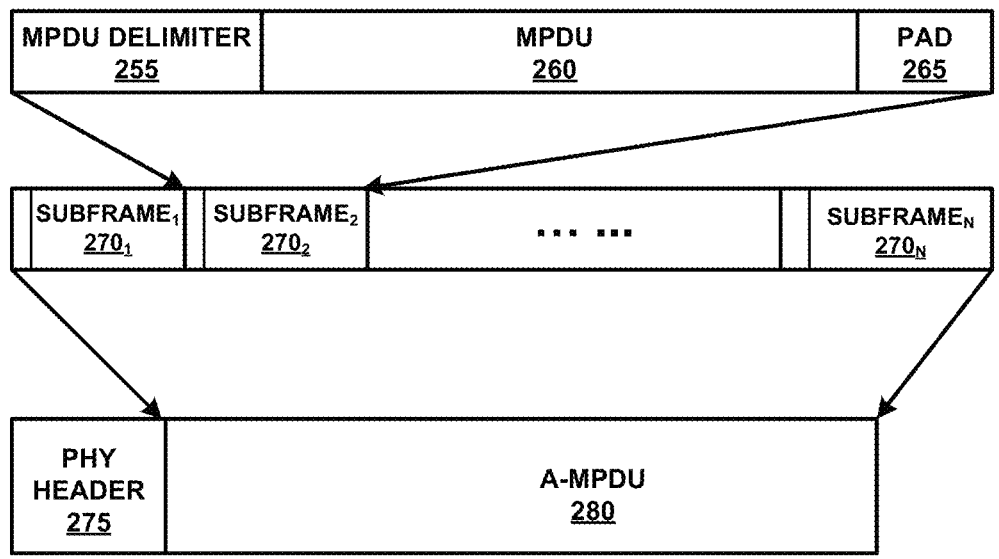
FIG. 2B illustrates an exemplary A-MPDU aggregation according to embodiments of the present disclosure.

FIGS. 2A-2B illustrate diagrams showing exemplary frame aggregations according to embodiments of the present disclosure. IEEE 802.11 standards employ two steps of accumulation to increase the size of the data frame. The first step, which is at the top of the MAC, collates MAC service data units (MSDUs) and is referred to as A-MSDU. The second step, which is at the bottom of the MAC, accumulates MAC protocol data units (MPDUs) and is referred to as A-MPDU.

FIG. 2A illustrates an exemplary A-MSDU aggregation according to embodiments of the present disclosure. Specifically, FIG. 2A illustrates an A-MSDU frame that includes a physical header 235, a MAC header 240, an aggregate MAC service data unit (A-MSDU) 245, and a frame check sequence (FCS) 250.

MAC service data units (MSDU) belonging to the same service category and destined for the same receiver are accumulated to form an aggregate MAC Service data unit (A-MSDU) 245. Each MSDU subframe, such as subframe$_1$ 230$_1$, subframe$_2$ 230$_2$, . . . , subframe$_N$ 230$_N$, is prepended with a sub-frame header comprising a destination address (DA) 205, a source address (SA) 210, and a payload length (LEN) 215. The data unit is also padded to a 32-bit word boundary by PAD 225. These units are then concatenated and passed on to the rest of the MAC protocol.

The aggregation process is limited by the maximum length of A-MSDU that the receiver can process. For example, this can be 4K bytes or 8K bytes, and is known from the high throughput (HT) capabilities information declared by each station. Also, the aggregation process is limited by the requirements of MSDU timeout. Each MSDU has a designated timeout value, and the MAC must attempt to deliver the MSDU to the peer-Local Link Control (LLC) within this timeout period with high probability. The process of aggregation involves waiting for more MSDUs to come from the LLC. The aggregation process must be limited such that the rest of the MAC steps and transmission can meet the delivery timing requirement.

FIG. 2B illustrates an exemplary A-MPDU aggregation according to embodiments of the present disclosure. Specifically, FIG. 2B illustrates an A-MPDU frame that includes a physical header 275, and an aggregate protocol data unit (A-MPDU) 280.

MAC protocol data units (MPDUs) at the bottom of the MAC are accumulated into a single aggregate protocol data unit (A-MPDU). Each MPDU subframe, such as subframe$_1$ 270$_1$, subframe$_2$ 270$_2$, . . . , subframe$_N$ 270$_N$, is prepended with a MPDU delimiter. A MPDU delimiter 255 is prepended to the MPDU 260, and pad bytes (PAD) 265 are added to align the end to a 32-bit word boundary. The delimiter contains the MPDU length, IEEE 802.11-n signature, and a Cyclic Redundancy Check (CRC) byte. The purpose of the delimiter is to allow the receiver to delineate later MPDUs in the aggregate even if one of the preceding delimiters is corrupted.

All MPDUs in the aggregate must belong to the same service category and be addressed to the same receiver. The total length of the aggregate is limited to 8K, 16K, 32K or 64K depending on the capability of the receiver. Since the aggregate is transmitted in one PHY frame, the receiver is trained only once at the beginning of the frame. The channel conditions may change significantly during a long frame, causing errors in reception. Hence, the length also is limited by the channel coherence duration. Further, a maximum of 64 MPDUs may be aggregated due to the limitation of the block acknowledgement response frame. Since MPDU encapsulation, and A-MPDU aggregation happen in the network interface, the amount of aggregation is also limited by the number of frames available in the transmitter queue.

The two types of aggregation schemes according to IEEE 802.11 standards differ in their utility. A-MSDU aggregation may be performed in the host system, which allows it to wait for MSDUs to arrive. By contrast the ability of A-MPDU aggregation, to wait for MPDUs, is limited by the space available in the transmit queue of the network interface. An A-MSDU is encapsulated into a single MPDU, with one sequence number. Should the MPDU fail to be received, it must be retransmitted fully. On the other hand, MPDUs in an A-MPDU have separate delimiters, allowing for partial recovery at the receiver, and unique sequence numbers allowing for selective retransmission. Finally, A-MSDU aggregation is more efficient than A-MPDU aggregation, as the latter must append a MPDU delimiter to each subframe.

Packet Marking Logic

For illustration purposes, the packet marking logic marks a frame to indicate one of the following: (a) the frame can be aggregated, (b) the frame is the last frame to be aggregated, or (c) the frame cannot be aggregated.

Figure 3:
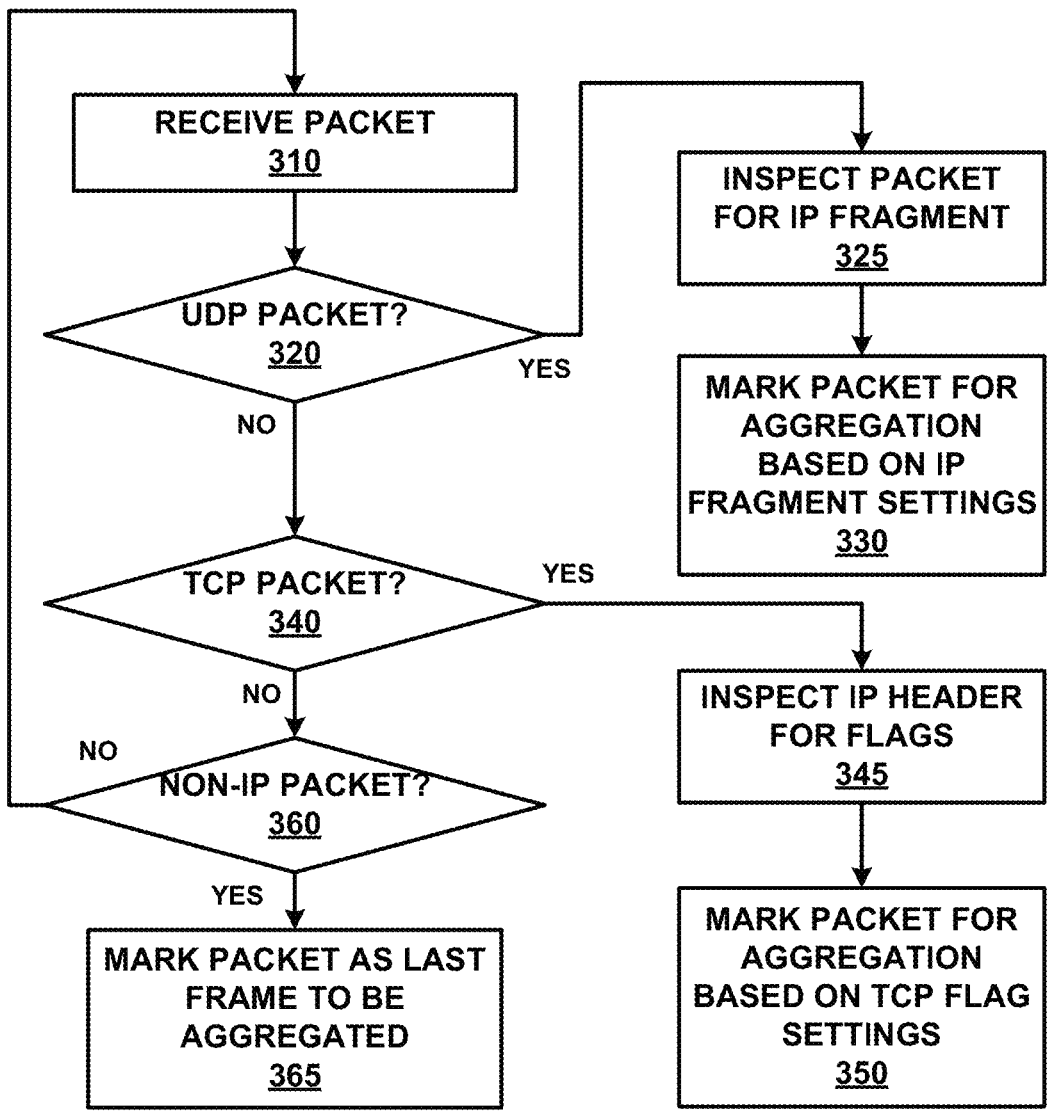
FIG. 3 illustrates an exemplary packet marking logic during operation according to embodiments of the present disclosure.

FIG. 3 illustrates an exemplary packet marking logic during operation according to embodiments of the present disclosure. During operation, the packet marking logic receives a packet (operation 310), and determines whether the received packet is a User Datagram Protocol (UDP) packet (operation 320). If the received packet is a UDP packet, the packet marking logic inspects packet for IP fragment (operation 325). Then, the packet marking logic marks the received packet for aggregation based on IP fragment settings (operation 330). If the received packet is not a UDP packet, the packet marking logic proceeds to determine whether the received packet is a Transmission Control Protocol (TCP) packet (operation 340).

If the received packet is a TCP packet, the packet marking logic inspects IP header of the received packet for TCP flags (operation 345). Next, the packet marking logic marks the received packet for aggregation based on TCP flag settings (operation 350).

If the received packet is not a TCP packet, the packet marking logic proceeds to determine if the received packet is a non-Internet Protocol (IP) packet (operation 360). If the received packet is a non-IP packet, e.g., a packet that does not include any IP header, then the packet marking logic will mark the received packet as a last frame to be aggregated (operation 365). The packet marking logic repeats the same process for each received packet. The following sections provide more detailed descriptions on the packet marking for each specific type of packets.

A. UDP Packets

In some embodiments, the disclosed system receives User Datagram Protocol (UDP) traffic, which could include fragmented packets. The physical network layer typically imposes an upper limit on the size of the frame that can be transmitted. When the IP layer receives an IP datagram to send, it determines which local interface the datagram is being sent on, and queries that interface to obtain its Maximum Transmission Unit (MTU). IP compares the MTU with the datagram size and performs fragmentation if necessary. When an IP datagram is fragmented, the IP layer at the destination performs the reassembly.

The IP header of the fragmented packet includes an identification field, a flags field, a fragment offset field, a length field, etc. The identification field contains a unique value for each IP datagram that the sender transmits. This number is copied into each fragment of a particular datagram. The flags field uses one bit as the "more fragments" bit. This bit is turned on for each fragment comprising a datagram except the final fragment. The fragment offset field contains the offset of this fragment from the beginning of the original datagram. Also, when a datagram is fragmented the total length field of each fragment is changed to be the size of that fragment.

When the "more fragments" bit is set, the packet marking logic can infer that more packets with subsequent fragments of the IP datagram will arrive. Thus, the packet marking logic can mark the packet as a frame that can be aggregated. On the other hand, if the "more fragments" bit is not set, the packet marking logic can determine that the current packet has the last fragment, and that there is no more packet expected to arrive. Thus, the packet marking logic can mark the current packet as the last frame to be aggregated. Note that, it is more efficient for the disclosed system to wait till the last fragment of the IP datagram is received to aggregate than aggregating when a fixed threshold is reached. By allowing waiting for more packets if there are more IP (or IPv6) fragments but aggregating the packets on the last IP fragment, the disclosed system ensures that no application-level delay will be seen by the network users.

In some embodiments, the packet marking logic identifies low payload traffic that is likely to be sensitive to latency, such as Real-Time Transport Protocol (RTP) packets for voice data. The packet marking logic will then mark those packets as a last frame to be aggregated, such that those packets can be aggregated with queued packets and transmitted immediately to reduce latency.

B. TCP Packets

In some embodiments, when the disclosed system receives Transmission Control Protocol (TCP) traffic, the packet marking logic will analyze TCP headers to determine how to mark the packets. For example, the packet marking logic may look for one or more flags in the TCP header, such as SYN, FIN, RST, PSH, URG, etc. Depending on the flags set in the TCP header, the packet marking logic will mark the packet accordingly.

(1) SYN

In order to begin the handshake process to establish a synchronization between the client and the server, the client sends to the server a packet with the SYN flag set. This is needed such that both the client and the server will maintain and keep their exchange of packets in the right order. In order to complete the handshake process with the client, the server will respond with an acknowledgment (ACK) packet with the SYN flag set. Thus, if the SYN flag is set in the TCP header of a received packet, the packet marking logic will mark the packet as last frame to be aggregated, because the disclosed system does not anticipate any further packets from the packet sender according to the handshake process. In other words, when the ACK packet with the SYN flag set is received from the server, the packet will be transmitted immediately without being aggregated because the disclosed system does not anticipate any further packets to be received from the server.

(2) FIN

FIN flag is set in a packet when the application on the sender side requests that the TCP connection be closed. The sender will not transmit any more data to the receiver after the packet with the FIN flag set is transmitted. However, immediately after receiving a packet with the FIN flag set, it is possible for the receiver to send some more data before sending its own packet with the FIN flag set. Thus, if the FIN flag is set in the TCP header of a received packet, the packet marking logic will mark the packet as the last frame to be aggregated, because the sender will not be sending any more packets to the receiver.

(3) RST

Each packet in a TCP connection contains a TCP header. Each of these headers contains a bit known as the "reset" (RST) flag. In most packets, the RST flag is not set and thus has no effect. However, if the RST flag is set in a packet, it indicates to the receiver that the receiver should immediately stop using the TCP connection. In particular, the receiver should not send any more packets using the TCP connection's ports, and should discard any further packets received with headers indicating that the packets belong to the particular TCP connection. In other words, a TCP reset by setting the RST flag is designed to terminate a TCP connection instantly. Thus, if the RST flag is set in the TCP header of a received packet, the packet marking logic will mark the packet as the last frame to be aggregated, because the receiver is expected to terminate the TCP connection immediately.

(4) PSH

TCP operates at layer 4 of the Open Systems Interconnection (OSI) model; it presents to upper layers a simple socket which can be read from and written to, masking the complexities of packet-based communications. To allow applications to read from and write to this socket at any time, buffers are implemented on both sides of a TCP connection in both directions. The socket that TCP makes available at the session level can be written to by the application with the option of "pushing" data out immediately, rather than waiting for additional data to enter the buffer. When this happens, the PSH flag in the outgoing TCP packet is set. Upon receiving a packet with the PSH flag set, the receiver side of the connection knows to immediately forward the segment up to the application. To summarize, TCP's push capability accomplishes two things: (a) the sending application informs TCP that data should be sent immediately, and (b) the PSH flag in the TCP header informs the receiving host that the data should be pushed up to the receiving application immediately. Note that, after the sender sends a packet with PSH flag set, the sender will not be sending any further data until it receives an ACK from the receiver. Thus, if the PSH flag is set in the TCP header of a received packet, the packet marking logic will mark the packet as the last frame to be aggregated, because the sender is waiting for the ACK packet from the receiver and will stop sending data to the receiver.

(5) URG

An Urgent Pointer could be used during a stream of data transfer where a host device is sending data to an application running on a remote device. If a problem appears, the host device needs to abort the data transfer and stop the data processing on the remote device. Under normal circumstances, the abort signal will be sent and queued at the remote device until all previously sent data is processed. However, in the above described scenario, the abort signal needs to be processed by the remote device immediately. By setting the URG flag, the remote device will not wait till all queued data is processed before executing the abortion. Instead, the remote device will give the specific packet with URG set high priority, process it immediately, and stop all further data processing. Thus, if the URG flag is set in the TCP header of a received packet, the packet marking logic will mark the packet as the last frame to be aggregated, because the sender is expecting the receiver to execute abortion immediately.

C. Non-IP Packets

In some embodiments, a received packet does not include any IP header, for example, an Address Resolution Protocol (ARP) packet, a Dynamic Host Configuration Protocol (DHCP) packet, etc. ARP is typically used to convert an IP address to a physical address, such as an Ethernet address. Neighbor Discovery Protocol (NDP) is an IPv6 protocol that provides similar functionalities to ARP. DHCP generally refers to a standardized networking protocol used by servers on an IP network to allocate IP addresses to client devices in order to automate the IP address configuration of a client device without a network administrator. When any such packet without an IP header is received, the packet marking logic will mark the packet as the last frame to be aggregated.

Frame Aggregation Logic

Figure 4:
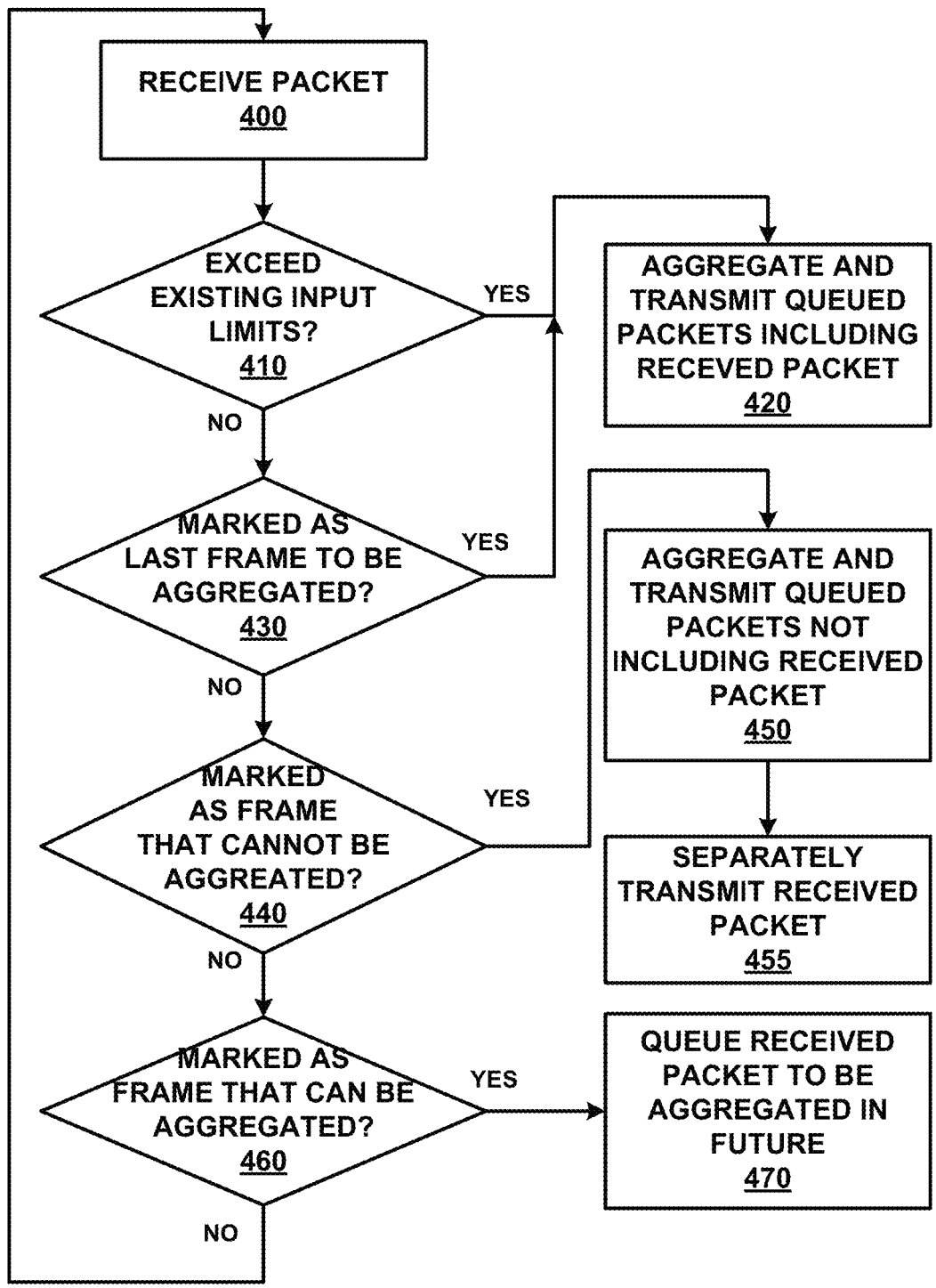
FIG. 4 illustrations an exemplary frame aggregation logic during operations in accordance with embodiments of the present disclosure.

FIG. 4 illustrations an exemplary frame aggregation logic during operations in accordance with embodiments of the present disclosure.

In some embodiments, the frame aggregation logic of the disclosed system aggregates and transmits the queued packets (including the last received packet) if the last received packet is marked as the last frame to be aggregated. This can be used in addition to the other input limits, such as packet timeout value, the threshold number of queued frames, and the threshold length of the queued frames.

In some embodiments, if the last received packet is marked as a frame that cannot be aggregated, the frame aggregation logic will aggregate and transmit the queued packets (not including the last received packet), and then transmit the last received packet separately. Note that, the disclosed system cannot transmit the packets out of order. Thus, in order to transmit the last received packet, the disclosed system needs to complete transmission of all other previously queued packets.

In some embodiments, if the last received packet is marked as a frame to be aggregated, the frame aggregation logic of the disclosed system will store the last received packet in the queue, and wait for future aggregation operation.

As illustrated in FIG. 4, during operations, the frame aggregation logic receives a packet (operation 400), and determines whether the received packet cause the system to exceed any of the existing input limits (e.g., timeout value, threshold number of queued frames, threshold length of queued frames, etc.) (operation 410). If so, the frame aggregation logic will proceed to aggregating and transmitting queued packets including the received packet (operation 420). Otherwise, the frame aggregation logic will determine whether the received packet is marked as the last frame to be aggregated (operation 430).

If the received packet is marked as the last frame to be aggregated, the frame aggregation logic will aggregate and transmit queued packets including the received packet (operation 420). If not, the frame aggregation logic proceeds to determine whether the received packet is marked as a frame that cannot be aggregated (operation 440).

If the received packet is marked as a frame that cannot be aggregated, the frame aggregation logic will aggregate and transmit queued packets, not including the received packet (operation 450). Next, the frame aggregation logic will separately transmit the received packet (operation 455).

If the received packet is not marked as a frame that cannot be aggregated, the frame aggregation logic proceeds to determine whether the received packet is marked as a frame that can be aggregated (operation 460). If the received packet is marked as a frame that can be aggregated, the frame aggregation logic will queue the received packet to be aggregated in the future (operation 470). The process repeats itself for each received packet.

Note that, in some embodiments, when multiple layers of aggregation co-exist (e.g., both A-MSDU and A-MPDU), each layer of frame aggregation may be distributed at a different network device. For example, the A-MSDU aggregation may be processed by a network controller, whereas the A-MPDU aggregation may be processed by an access point. Alternatively, both the A-MSDU and the A-MPDU aggregations can be processed by the same network device. More specifically, in one embodiment, if an access point operates in a bridge mode, both A-MSDU and A-MPDU aggregations are processed by the access point. If an access point operates in a tunnel mode, then the A-MSDU aggregation is processed by a network controller, whereas the A-MPDU aggregation is processed by the access point. In addition, the packet marking logic and the frame aggregation logic may reside on different devices with access to shared information.

Sliding Window

Figure 5:
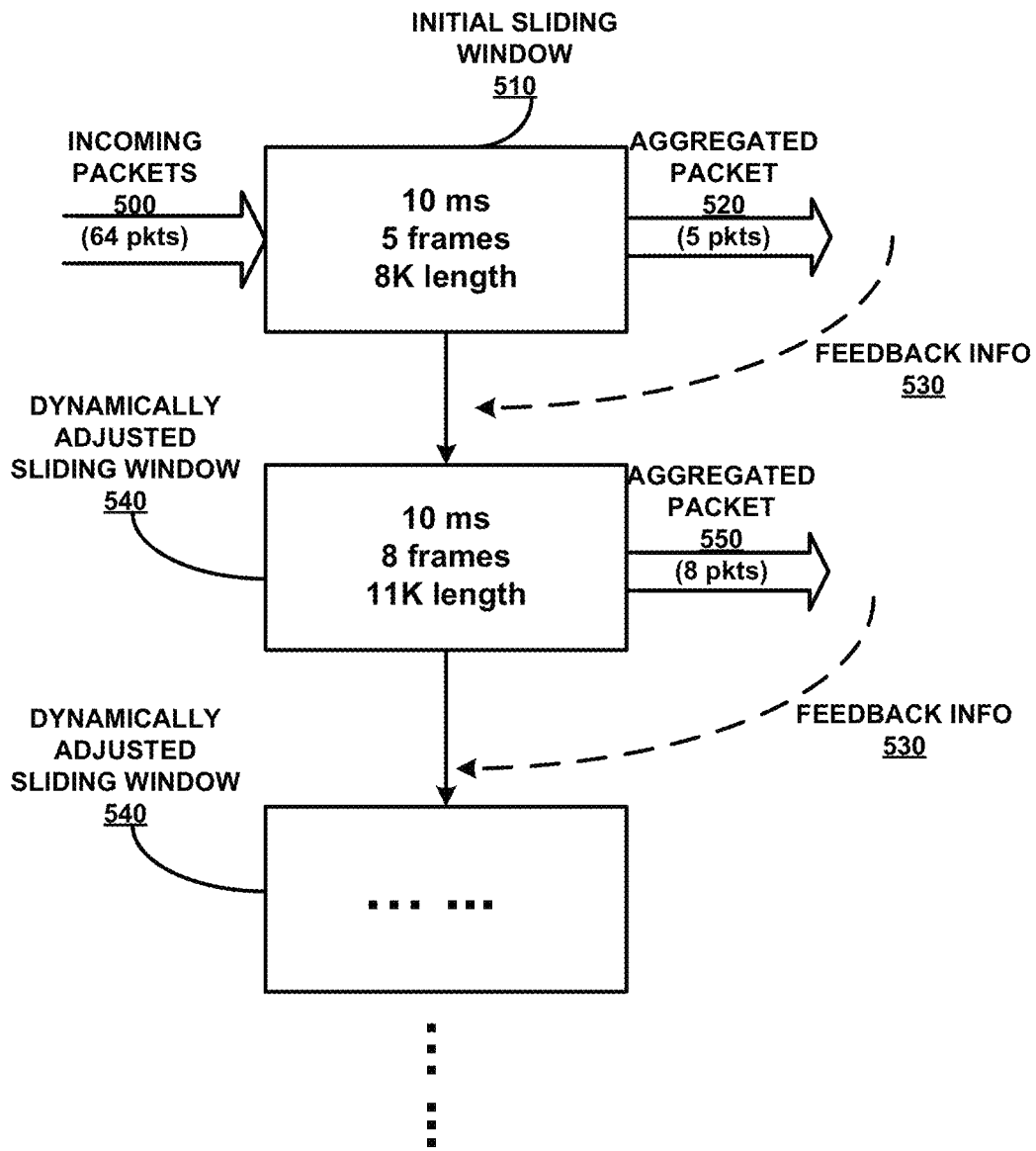
FIG. 5 illustrates an exemplary sliding window mechanism in accordance with the present disclosure.

FIG. 5 illustrates an exemplary sliding window mechanism in accordance with the present disclosure. As described above, conventional inputs to aggregation limits include (a) a number of packets, (b) a total packet length, and (c) a time delay to receive packets into buffer. Typically, there is a fixed limit for each of the parameters in the frame aggregation logic. Thus, if any one of the input limit is reached, the queued packets will be aggregated and transmitted. Hence, no further aggregation can occur when any input limit is reached.

With the technique disclosed herein, the frame aggregation logic attempts to dynamically adjust the input parameters through a sliding window rather than applying a fixed input limit. Specifically, the parameters in a sliding window may include, but are not limited to, the followings:

(1) A variable number of packets, e.g., 0-15 for A-MSDU aggregation, and/or 0-64 for A-MPDU aggregation. Alternatively, the variable number of packets can be any value between 0 and the maximum number of client devices supported by the sliding window.

(2) A variable total packet length, e.g., 0-11K for A-MSDU aggregation, and/or 0-1M for A-MPDU aggregation (or the lower of maximum number of supported client devices).

(3) A variable time delay, e.g., 10 nanoseconds to 1 microsecond depending on platform capability.

In some embodiments, the values start from a lower limit. If for any reason a triggering event occurs, all of the parameters in a sliding window are revised. For example, if the timeout value is exceeded, the timeout threshold in the sliding window will be reduced. The adjustment process will repeat itself, and therefore the timeout threshold will keep being reduced until the packet transmissions do not exceed the timeout value. Likewise, if the threshold number of packets is exceeded, then the threshold number of packets in the sliding window will be increased. Moreover, if the threshold packet length is exceeded, then the threshold packet length in the sliding down will be increased.

If any parameter is already at the minimum or maximum allowed value, then one or more of the other parameters will be adjusted accordingly to improve the efficiency of aggregation.

In some embodiments, the sliding window mechanism keeps track of the last transmitted aggregated packet to determine whether the transmission was a success or a failure. If the last aggregated packet failed to be transmitted, the sliding window mechanism analyzes the cause for the failure, e.g., whether due to a timeout event, or the number of packets being exceeded, or the length of packets being exceeded, etc. Based on the results of the analysis, the sliding window mechanism will modify its parameters prior to the next plurality of packets to be aggregated.

As illustrated in FIG. 5, an initial sliding window 510 may be set with a timeout value of 10 milliseconds, a threshold of 5 total frames in an aggregated packet, and a threshold of 8K bytes in length of an aggregated packet. During operation, the sliding window mechanism receives a number of incoming packets 500, for example, 64 packets, to be transmitted to a client device. With the settings of initial sliding window 510, the sliding window mechanism aggregates 5 frames into an aggregated packet 520, and transmit aggregated packet 520 to the client device. In addition, the sliding window mechanism gathers feedback information 530 regarding the transmission of the most recent aggregated packet (e.g., aggregated packet 520). Specifically, feedback information 530 may indicate that the threshold of 5 total frame is reached in aggregated packet 520. Based on feedback information 530, the sliding window mechanism dynamically adjusts the sliding window to generate the dynamically adjusted sliding window 540. For example, if the previous transmission of aggregated packet 520 is successful but the threshold of total number of frames is hit, dynamically adjusted sliding window 540 can be set with the same timeout value of 10 milliseconds, but an increased threshold of 8 total frames in an aggregated packet, and an increased threshold of 11K bytes in length of an aggregated packet. Thus, with the settings of dynamically adjusted sliding window 540, the sliding window mechanism aggregates 8 frames into an aggregated packet 530, and transmit aggregated packet 530 to the client device. Moreover, the sliding window mechanism continue to gather the feedback information 530 corresponding to the transmission of aggregated packet 530, and further adjust sliding window dynamically. The adjustment process repeats itself in the same fashion with the transmission of each aggregated packet and continuously improves the efficiency of the frame aggregation.

In some embodiments, the sliding window mechanism can adjust sliding window parameters based on feedback information that indicates a specific network condition, e.g., a lossy environment. For example, if the number of retries is high or the packet loss rate is high, the sliding window parameters can be reduced to a lower limit, because the goal of reducing packet loss is more critical than improving aggregation efficiency. To identify a lossy environment, a network device, such as an access point or controller, can keep track of the number of packets that have been transmitted, and the number of packets that have been lost during transmission. The sliding window logic can receive such statistics from the network device and determine whether a lossy environment exists. Also, in the scenario of TCP connection, the TCP feedback parameters can be used to evaluate whether a lossy environment exists. Herein, a lossy environment generally refers to an adverse network environment in which packets are prone to be lost during transmission.

Processes for Efficient Frame Aggregation

Figure 6A:
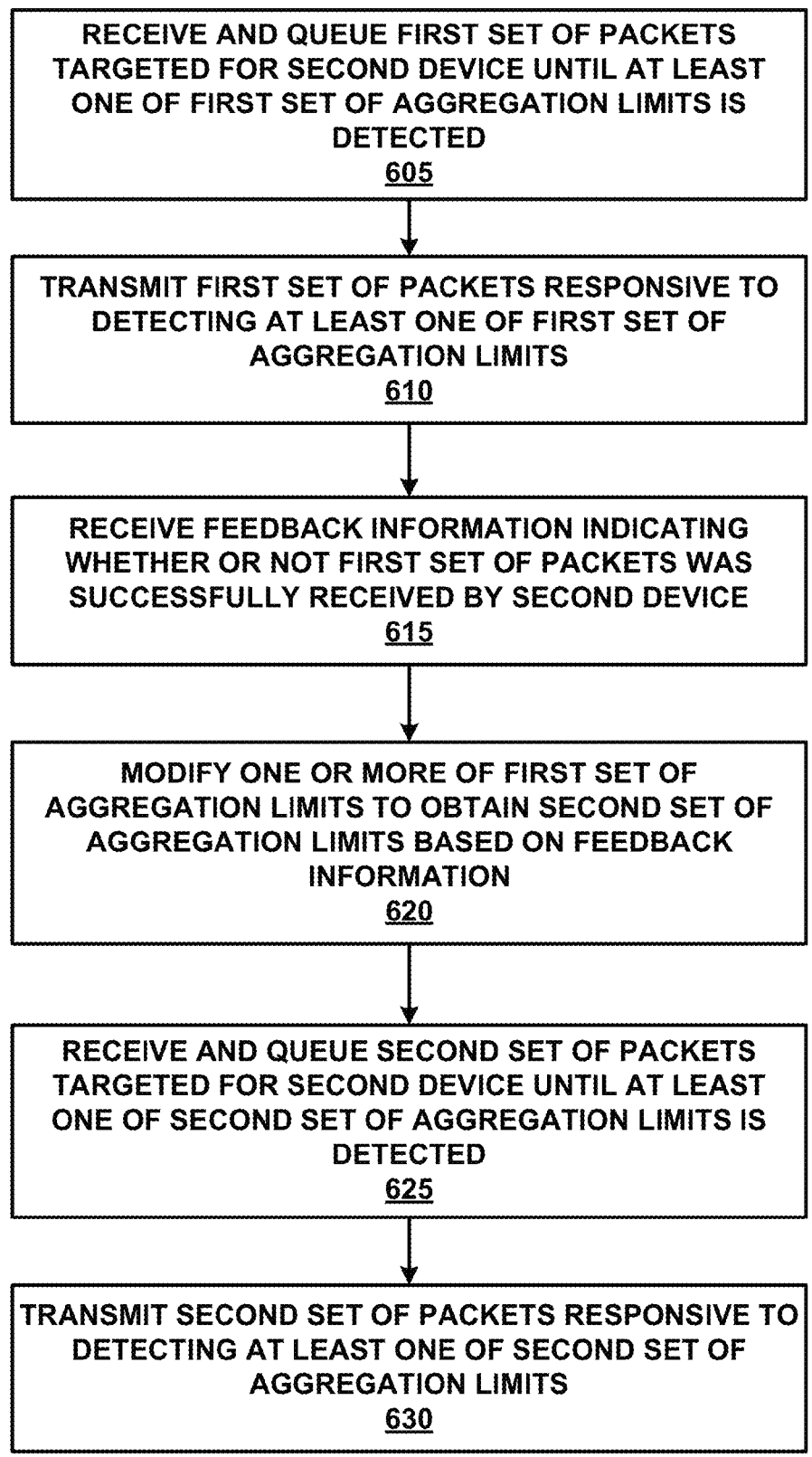
FIG. 6A shows a flowchart for an exemplary process for efficient frame aggregation according to embodiments of the present disclosure.

FIG. 6A shows a flowchart for an exemplary process for efficient frame aggregation according to embodiments of the present disclosure. During operations, a network device receives and queues a first set of packets targeted for a second device until at least one of the first set of aggregation limits is detected (operation 605). The network device then transmits the first set of packets responsive to detecting at least one of the first set of aggregation limits (operation 610).

Next, the network device receives feedback information indicating whether or not the first set of packets was successfully received by the second device (operation 615). For example, the feedback information may indicate whether packet transmission was successful. This feedback information can be used to increase or decrease aggregation limits. Specifically, if packet transmission was successful, aggregation limits may be increased. On the other hand, if packet transmission was unsuccessful, then the aggregation limits may be reduced.

Then, the network device modifies one or more of the first set of aggregation limits to obtain a second set of aggregation limits based on the feedback information (operation 620). For example, each of the second set of aggregate limits may be modified up to a maximum value or down to a minimum value.

Subsequently, the network device receives and queues a second set of packets targeted for the second device until at least one of the second set of aggregation limits is detected (operation 625). The network device then transmits the second set of packets responsive to detecting at least one of the second set of aggregation limits (operation 630).

In some embodiments, the first set of aggregation limits comprises (1) a number of aggregated packets; (2) a total amount of data in the aggregated packets; and (3) a time period since the first packet in the first set of packets is received.

In some embodiments, transmitting the first set of packets comprises aggregating the first set of packets into a single frame and transmitting the single frame or consecutively transmitting each of the first set of packets in a corresponding frame.

In some embodiments, queuing the first set of packets is performed at one or more of: OSI layers 3 to 7. In some embodiments, queuing the first set of packets is performed at one or more of: of OSI layer 1 or OSI layer 2.

In some embodiments, modifying the first set of aggregation limits comprises one or more of: (a) increasing the one or more of the first set of aggregation limits responsive to determining that the first set of packets were successfully received by the second device or (b) decreasing one or more of the first set of aggregation limits responsive to determining that a portion of the first set of packets were not successfully received by the second device. In some embodiments, modifying the one or more of the first set of aggregation limits is based on the at least one of first set of aggregation limits that was detected.

In some embodiments, modifying the one or more of the first set of aggregation limits comprises one or more of: (a) increasing the at least one of the first set of aggregation limits that was detected, (b) decreasing aggregation limit(s) other than the at least one of the first set of aggregation limits that was detected, or (c) modifying a first aggregation limit of the first set of aggregation limits, based on a second aggregation limit, of the first set of aggregation limits, being at a maximum value or minimum value.

In some embodiments, modifying the one or more of the first set of aggregation limits comprises determining the second set of aggregation limits based on characteristics associated with an interfering signal.

In some embodiments, modifying the one or more of the first set of aggregation limits is based on an expected change in an amount of data to be transmitted.

Figure 6B:
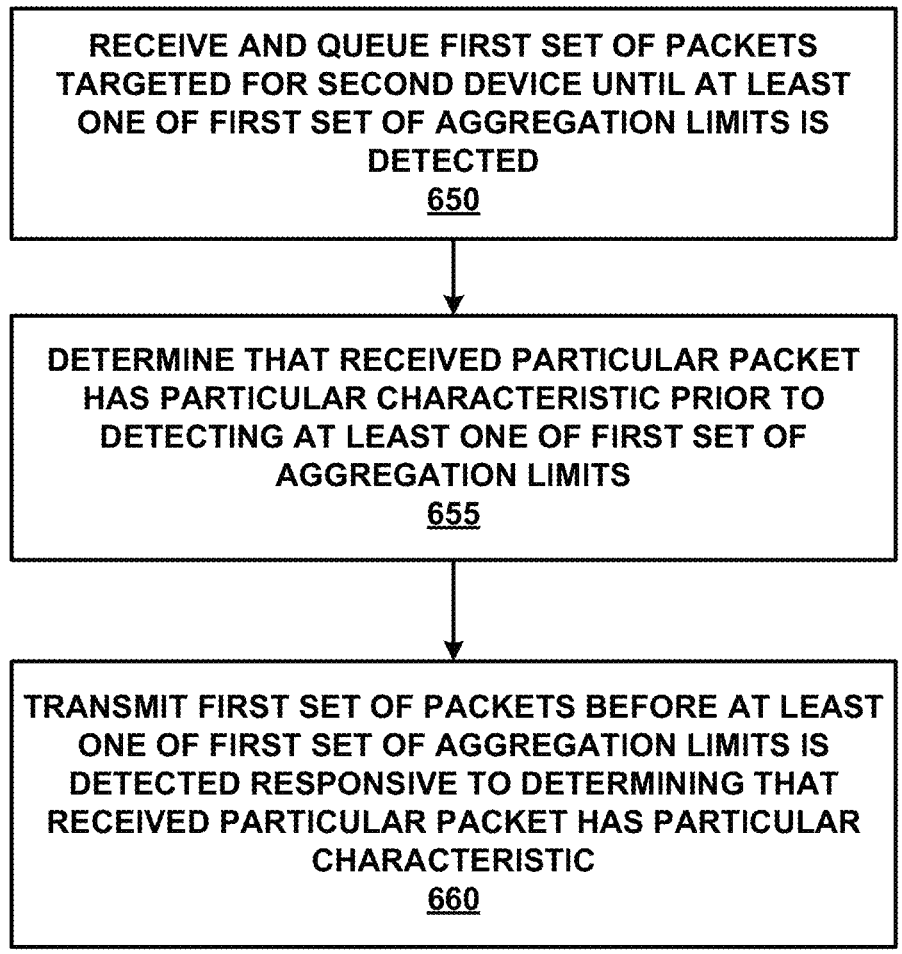
FIG. 6B shows a flowchart for another exemplary process for efficient frame aggregation according to embodiments of the present disclosure.

FIG. 6B shows a flowchart for another exemplary process for efficient frame aggregation according to embodiments of the present disclosure. During operations, a network device receives and queues a first set of packets targeted for a second device until at least one of the first set of aggregation limits is detected (operation 650). The network device then determines that a received particular packet has a particular characteristic prior to detecting at least one of the first set of aggregation limits (operation 655). The network device then transmits the first set of packets before at least one of the first set of aggregation limits is detected responsive to determining that the received particular packet has the particular characteristic (operation 660).

In some embodiments, the network device further transmits the particular packet with the first set of packets. In some embodiments, the network device transmits the particular packet separately from the first set of packets.

In some embodiments, the first set of packets is transmitted in a single frame or the first set of packets is consecutively transmitted in corresponding frames.

In some embodiments, the particular characteristic of the at least one packet indicates that the at least one packet is not to be aggregated with any preceding packets, where the network device transmits the first set of packets without transmitting the particular packet. In some embodiments, the particular characteristic of the at least one packet indicates that the at least one packet is a last packet in a sequence of packets, where the network device transmits the first set of packets including the particular packet.

Figure 7:
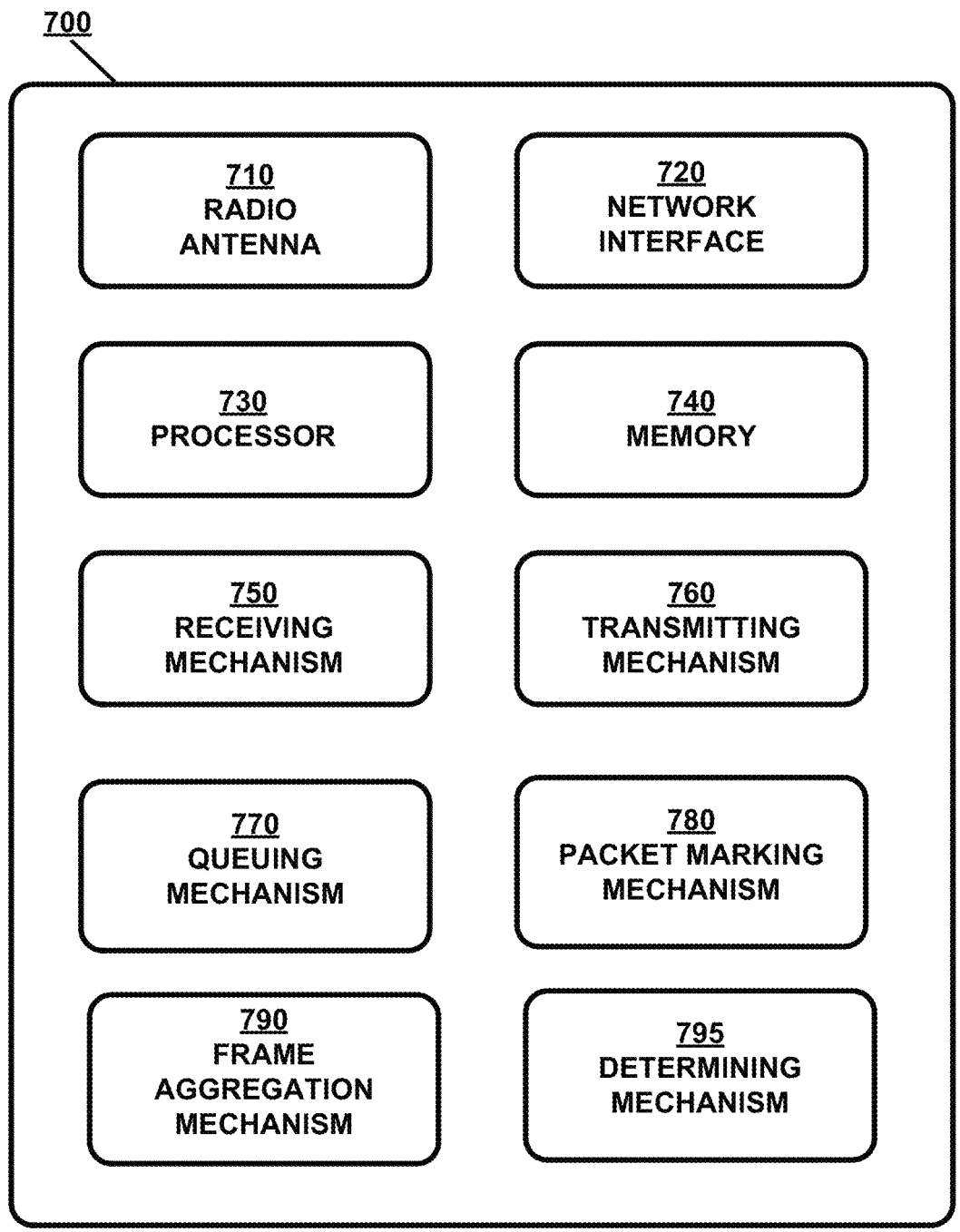
FIG. 7 is a block diagram illustrating a system for efficient frame aggregation according to embodiments of the present disclosure.

The particular characteristic can be a particular packet type. Also, the particular characteristic may indicate whether or not the particular packet is a last fragment. In some embodiments, the particular packet is received using a TCP protocol, where the particular characteristic is a flag type. In some embodiments, the particular characteristic indicates a connection type, such as TCP, UDP, or RTP. Also, the particular characteristic can be a packet length System for Efficient Frame Aggregation FIG. 7 is a block diagram illustrating a system for efficient frame aggregation according to embodiments of the present disclosure.

Network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a transmitting mechanism 760, a queuing mechanism 770, a packet marking mechanism 780 a frame aggregation mechanism 790, and a determining mechanism 795, all of which are in communication with processor 730 and/or memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc.

Receiving mechanism 750 generally receives one or more network messages via network interface 720 or radio antenna 710 from a wireless client. The received network messages may include, but are not limited to, requests and/or responses, beacon frames, management frames, control path frames, and so on. In some embodiments, the packets received by receiving mechanism 750 from the client device are acknowledgement frames (e.g., ACKs), feedback information, etc.

Transmitting mechanism 760 generally transmits messages, which include, but are not limited to, requests and/or responses, beacon frames, management frames, control path frames, and so on. Transmitting mechanism 760 may transmit queued packets including a last received packet in an aggregated frame. Alternatively, transmitting mechanism 760 may transmit queued packets in an aggregated frame, and then transmit a last received packet separately.

Queuing mechanism 770 generally queues packet for aggregation and transmission at a future time when one or more aggregation limits are reached or when a particular packet having a particular characteristic is received.

Packet marking mechanism 780 generally logic marks a frame to indicate one of the following: (a) the frame can be aggregated, (b) the frame is the last frame to be aggregated, or (c) the frame cannot be aggregated.

Frame aggregation mechanism 790 generally aggregates the queued packets. In some embodiments, the queued packets include the last received packet, if the last received packet is marked as the last frame to be aggregated by packet marking mechanism 780. This can be used in addition to the other input limits, such as packet timeout value, the threshold number of queued frames, and the threshold length of the queued frames. If, however, the last received packet is marked as a frame that cannot be aggregated by packet marking mechanism 780, frame aggregation mechanism will aggregate the queued packets without including the last received packet. Finally, if the last received packet is marked as a frame to be aggregated by packet marking mechanism 780, frame aggregation mechanism 790 will store the last received packet in the queue, and wait for future aggregation operation.

Determining mechanism 795 generally determines whether a set of aggregation limits is reached or whether a particular received packet has a particular characteristic, e.g., a particular marking such as a flag that indicates the frame cannot be aggregated or is the last frame to be aggregated.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by a first device, cause the first device to:
   receive and queue a first set of packets targeted for a second device until at least one of a first set of aggregation limits is detected;
   responsive to detecting the at least one of the first set of aggregation limits, transmit the first set of packets to the second device;
   receive feedback information indicating whether or not the first set of packets was successfully received by the second device;
   based on the feedback information, modify one or more of the first set of aggregation limits to obtain a second set of aggregation limits, wherein to modify the one or more of the first set of aggregation limits, the instructions are further to cause the first device to modify a first aggregation limit of the first set of aggregation limits based on a second aggregation limit of the first set of aggregation limits being at a maximum value or a minimum value;
   receive and queue a second set of packets targeted for the second device until at least one of the second set of aggregation limits is detected; and
   responsive to detecting the at least one of the second set of aggregation limits, transmit the second set of packets.

2. The medium of claim 1, wherein the first set of aggregation limits comprises:
   a number of aggregated packets;
   a total amount of data in the aggregated packets; and
   a time period since the first packet in the first set of packets is received.

3. The medium of claim 1, wherein to transmit the first set of packets, the instructions are further to cause the first device to aggregate the first set of packets into a single frame and transmit the single frame or consecutively transmit each of the first set of packets in a corresponding frame.

4. The medium of claim 1, wherein to queue the first set of packets, the instructions are further to cause the first device to queue the first set of packets at one or more of:
   Open System Interconnection (OSI) layers 3 to 7.

5. The medium of claim 1, wherein to queue the first set of packets, the instructions are further to cause the first device to queue the first set of packets at one or more of:
   Open System Interconnection (OSI) layer 1 and OSI layer 2.

6. The medium of claim 1, wherein to modify the first set of aggregation limits, the instructions are further to cause the first device to one or more of: (a) increase the one or more of the first set of aggregation limits responsive to a determination that the first set of packets was successfully received by the second device and (b) decrease one or more of the first set of aggregation limits responsive to a determination that a portion of the first set of packets was not successfully received by the second device.

7. The medium of claim 1, wherein to modify the one or more of the first set of aggregation limits, the instructions are further to cause the first device to modify the one or more of the first set of aggregation limits based on the at least one of first set of aggregation limits that was detected.

8. The medium of claim 1, wherein to modify the one or more of the first set of aggregation limits, the instructions are further to cause the first device to one or more of: (a) increase the at least one of the first set of aggregation limits that was detected, and (b) decrease aggregation limit(s) other than the at least one of the first set of aggregation limits that was detected.

9. The medium of claim 1, wherein the to modify the one or more of the first set of aggregation limits, the instructions are further to cause the first device to determine the second set of aggregation limits based on characteristics associated with an interfering signal.

10. The medium of claim 1, wherein to modify the one or more of the first set of aggregation limits, the instructions are further to cause the first device to modify the one or more of the first set of aggregation limits based on an expected change in an amount of data to be transmitted.

11. A non-transitory computer readable medium comprising instructions which, when executed by one or more devices, causes performance of operations comprising:
    receiving and queuing, by a first device, a first set of packets targeted for a second device until at least one of a first set of aggregation limits is detected;
    modifying a first aggregation limit of the first set of aggregation limits based on a second aggregation limit of the first set of aggregation limits being at a maximum value or a minimum value;
    prior to detecting at least one of the first set of aggregation limits, determining that a received particular packet has a particular characteristic;
    responsive to determining that the received particular packet has the particular characteristic, transmitting the first set of packets before the at least one of the first set of aggregation limits is detected;
    receiving and queuing a second set of packets targeted for the second device until at least one of the second set of aggregation limits is detected; and
    responsive to detecting the at least one of the second set of aggregation limits, transmitting the second set of packets.

12. The medium of claim 11, wherein the instructions are further to cause the first device to transmit the particular packet with the set of packets.

13. The medium of claim 11, wherein the instructions are further to cause the first device to transmit the particular packet separately from the set of packets.

14. The medium of claim 11, wherein the instructions are further to cause the first device to transmit the packets of the set of packets in a single frame, or to cause the first device to transmit the packets of the set of packets consecutively in corresponding frames.

15. The medium of claim 11, wherein the particular characteristic of the particular packet indicates that the particular packet is not to be aggregated with any preceding packets, and wherein the instructions to cause the first device to transmit the set of packets are further to cause the first device to transmit the set of packets without transmitting the particular packet.

16. The medium of claim 11, wherein the particular characteristic of the particular packet indicates that the particular packet is a last packet in a sequence of packets, and wherein the instructions to cause the first device to transmit the set of packets are further to cause the first device to transmit the set of packets including the particular packet.

17. The medium of claim 11, wherein the particular characteristic is a particular packet type.

18. The medium of claim 11, wherein the particular characteristic indicates whether or not the particular packet is a last fragment.

19. The medium of claim 11, wherein the instructions are further to cause the first device to receive the particular packet using a Transmission Control Protocol (TCP) protocol, and wherein the particular characteristic is a flag type.

20. The medium of claim 11, wherein the particular characteristic indicates a connection type, the connection type being one of: Transmission Control Protocol (TCP), User Datagram Protocol (UDP), or Real-time Transport Protocol (RTP).

21. The medium of claim 11, wherein the particular characteristic is a packet length.

* * * * *